United States Patent [19]

Kamata et al.

[11] Patent Number: 4,479,165
[45] Date of Patent: Oct. 23, 1984

[54] GAS INSULATED SWITCHING APPARATUS

[75] Inventors: Isao Kamata, Sagamihara; Satoshi Ohyama, Yokohama, both of Japan

[73] Assignee: Tokyo Shibaura Denki Kabushiki Kaisha, Kawasaki, Japan

[21] Appl. No.: 345,673

[22] Filed: Feb. 4, 1982

[30] Foreign Application Priority Data

Feb. 6, 1981 [JP] Japan .................................. 56-15647
Feb. 27, 1981 [JP] Japan .................................. 56-26908

[51] Int. Cl.³ ............................................. H02B 1/04
[52] U.S. Cl. .................................. 361/335; 200/148 B
[58] Field of Search ................... 200/148 B; 361/333, 361/335

[56] References Cited

U.S. PATENT DOCUMENTS

| | | | |
|---|---|---|---|
| 3,891,862 | 6/1975 | Clark | 361/333 |
| 3,903,387 | 9/1975 | Sasaki et al. | 200/148 B |
| 4,035,693 | 7/1977 | Luxa et al. | 361/120 |
| 4,045,634 | 8/1977 | Nakano et al. | 200/148 B |
| 4,241,379 | 12/1980 | Olsen | 361/335 |

FOREIGN PATENT DOCUMENTS 2647106 5/1977 Fed. Rep. of Germany .
53-7013 3/1978 Japan .
53-21094 6/1978 Japan .

Primary Examiner—Robert S. Macon
Attorney, Agent, or Firm—Oblon, Fisher, Spivak, McClelland & Maier

[57] ABSTRACT

A bushing in air is supported upright on one end of a horizontal tank, and a center conductor extending in the bushing is connected to one terminal of a circuit breaker accommodated in the tank. A tank of a disconnecting switch is disposed to extend in the axial direction of the circuit breaker tank and is coupled to the other end thereof through an annular current transformer and also via gas-tight means. A bushing support tank disposed to extend along the ground surface is coupled via gas-tight means to the other end of the disconnecting switch tank. Another bushing in air is supported upright on the bushing support tank. A grounding switch is provided inside the bushing support tank. A center conductor extending in the second bushing is connected to an arrester through a removable conductor.

9 Claims, 6 Drawing Figures

4,479,165

GAS INSULATED SWITCHING APPARATUS

BACKGROUND OF THE INVENTION

This invention relates to gas insulated switching apparatus and, more particularly, to a hybrid type gas insulated switching apparatus in which air insulation and gas insulation, for instance by SF$_6$, are used in combination.

FIG. 1 shows an elevational view, partly broken away, showing a hybrid type gas insulated switching apparatus which has been proposed earlier by the inventors. This apparatus is constructed for applications with a very high voltage rating of, for instance, 550,000 volts. In this case, the air insulation distance L between a pair of bushings 2a and 2b in air is required to be about 6 m. The bushing 2a is supported upright on a support 4a. The support 4a also supports one end of a horizontal cylindrical tank 5a. The other end of the cylindrical tank 5a is supported on a different support 4b. Insulating gas, for instance SF$_6$, is sealed together with a circuit breaker body 5b in the cylindrical tank 5a. One terminal section 5c extending from one end of the circuit breaker body 5b is supported by an insulating spacer 6 and is connected to one end of a dummy conductor 7. The dummy conductor 7 is sealed inside a casing 8, and an annular current transformer 9 is mounted on the outer periphery of the casing 8 concentrically with the dummy conductor 7. The casing 8 is supported on a support 12 which extends upright from a support base 11 provided on a foundation 10.

The other end portion of the dummy conductor 7 is supported by an insulating spacer 13 and extends into a disconnecting switch 14 where it is connected to one terminal section 14a of the switch 14. The lower end of the terminal section 14a is coupled to a switch mechanism section 15 of the disconnecting switch 14 mounted on the support base 11. When the switch mechanism section 15 is driven, a movable contact of the terminal section 14a is upwardly moved into contact with a fixed contact of the other terminal section 14b. As a result, a center conductor extending in the bushing 2b in air and the dummy conductor 7 are connected to each other via the disconnecting switch 14. On one side of the terminal section 14b, a fixed terminal 16a of a grounding switch 16 is disposed, and a movable terminal of the grounding switch 16 is provided on a casing 14c of the disconnecting switch 14 such that it faces the fixed terminal 16a. Although not shown, the movable terminal side of the switch 16 is grounded.

A conductor 17 projects from a different side of the terminal section 14b and penetrates two insulating spacers 18 and 19 to be led into the interior of a casing of a lightning arrester 20 and connected to a terminal section 20a thereof. An insulated cylindrical intermediate electrode 21 coaxially surrounds the conductor 17 between the insulating spacers 18 and 19. Designated at 22a and 22b are shields in air provided for enhancing the insulation of the bushings 2a and 2b in air, and at 23 a CT.

With the gas insulated switching apparatus of the above construction, the bushing 2b in air extends upright above the support base 11 and is supported at the lower end by the casing 14c of the disconnecting switch 14, that is, the casing 14c also serves as a support of the bushing 2b. The grounding switch 16 is provided for the purpose of draining the induced current in the power transmission line connected to the terminal section 14b to ground at the time of the maintenance and inspection.

When the grounding switch 16 is operated, a great deal of metal particles are generated from the terminal sections and other parts being operated. These metal particles fall through the casing 14c and are accumulated on the insulating spacer 13 supporting the terminal section 14a of the disconnecting switch 14. Therefore, the insulating property of the insulating spacer 13 is deteriorated in long use. By way of example, in a high capacity power transmission system, for instance of 550,000 V and 12,000 A, the induced voltage and current are as high as 90,000 V and 1,500 A. To drain such high induced current, the grounding switch has to be provided with a contact section having a gas puffing function. Therefore, the switch mechanism section is increased in size to increase the size of the overall switching apparatus. To cope with the reduction of the dielectric breakdown due to metal particles, it is necessary to use a large size insulating spacer of the contamination resisting type, and this also promotes the size increase. Further, with the construction shown in FIG. 1 the grounding switch for grounding the terminal section 14b is disposed at a comparatively high level from the ground surface. Therefore, an operating floor is necessary for its operation and inspection. This increases the installation cost and also inconvenience is felt in operation and maintenance.

In a further aspect, while a breakdown voltage test is made when the gas insulated switching apparatus of FIG. 1 is installed, at this time a high test voltage is applied to the arrester 20 as well. Where a zinc oxide is used as an element in the arrester 20, it is deteriorated by the application of the overvoltage as the test voltage, and this is inconvenient.

SUMMARY OF THE INVENTION

An object of the invention is to provide a highly reliable gas insulated switching apparatus, which can eliminate the deterioration of the insulating property that might otherwise be caused by the accumulation of metal particles generated at the time of the opening and closing operations of the grounding switch, improve the convenience of the operation and inspection of various parts and prevent the deterioration of a lightening arrester, if provided, at the time of the breakdown voltage test as well as having sufficient quake-resisting property and being suited to recent high capacity power transmission systems.

According to the invention, the above object is achieved by a gas insulated switching apparatus, which comprises a circuit breaker including a horizontal grounded tank containing a sealed insulating gas and a circuit breaker section accommodated in the grounded tank and having one terminal section connected to a center conductor extending in a first bushing, a first bushing in air disposed upright on one side of the grounded tank, a disconnecting switch including a second tank disposed in the axial direction and adjacent to and coupled via gas-tight means to the other end of the horizontal grounded tank than that on the afore-said one side, and containing a sealed insulating gas and a disconnecting switch section accommodated in the second tank, a bushing support tank disposed in the axial direction of and adjacent to and coupled via gas-tight means to the end of the second tank opposite the circuit breaker and containing a sealed insulating gas, the bushing support tank accommodating a grounding switch, and a second bushing in air disposed upright on top of the bushing support tank, the other terminal section of the circuit breaker being connected to one terminal of the disconnecting switch section via a conductor, the other terminal of the disconnecting switch section being connected to a fixed contact of the grounding switch and also to a center conductor extending in the second bushing via a conductor.

DETAILED DESCRIPTION OF THE PREFERRED EMBODIMENTS

Figure 1:
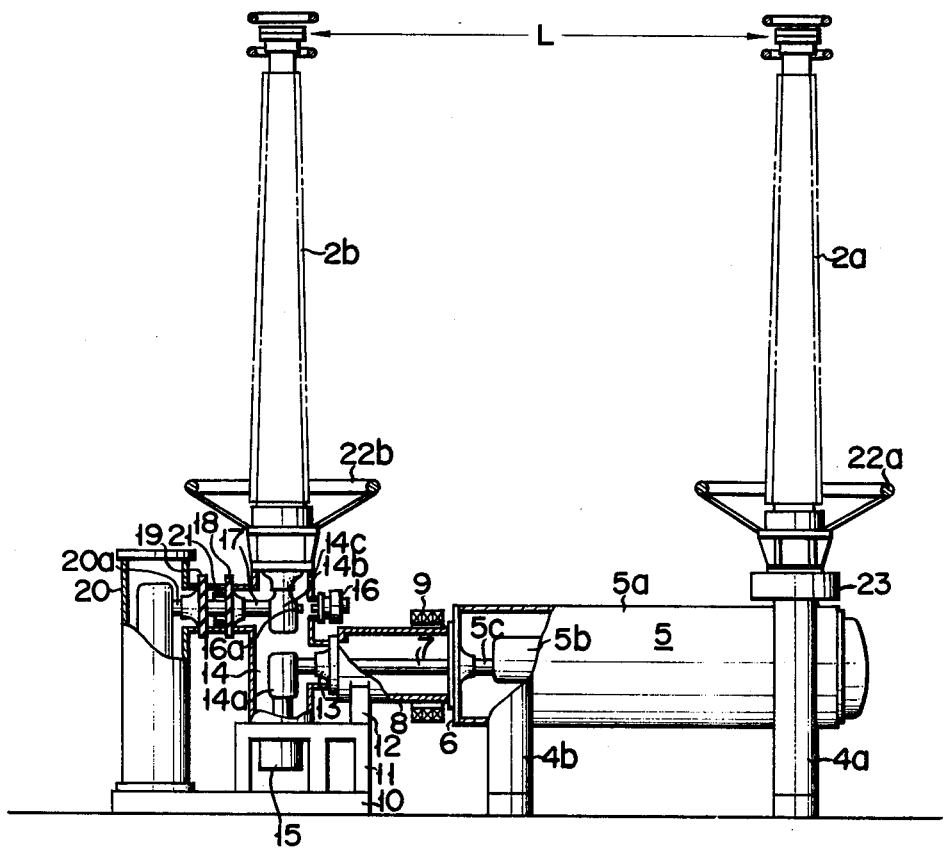
FIG. 1 is an elevational view, partly broken away, showing a gas insulated switching apparatus proposed earlier by the inventors.

Now, preferred embodiments of the invention will be described with reference to the drawings. In the Figures illustrating respective embodiments, like parts as those in FIG. 1 are designated by like reference numerals and symbols.

Figure 2:
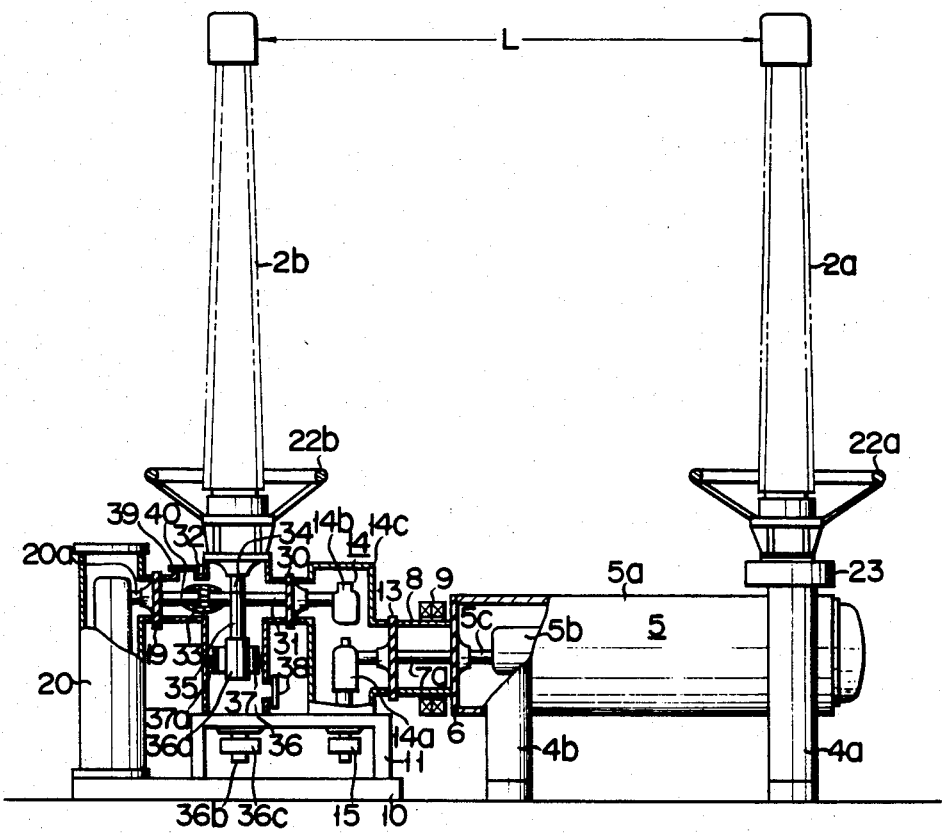
FIG. 2 is an elevational view, partly broken away, showing one embodiment of the gas insulated switching apparatus according to the invention.

FIG. 2 shows one embodiment of the invention. Referring to the Figure, a circuit breaker 5, which has the same construction as that shown in FIG. 1, has its terminal section 5c penetrating an insulating spacer 6 and connected to a conductor 7a. The conductor 7a has a very small length compared to the dummy conductor 7 shown in FIG. 1, because in this embodiment the conductor 7a need be provided by taking only the annular current transformer 9 into consideration. The conductor 7a penetrates insulating spacer 13 and is connected to the terminal section 14a of disconnecting switch 14. The casing 14c of disconnecting switch 14 is mounted on support base 11 on foundation 10. Switch mechanism section 15 is mounted on the underside of the support base 11 at a position thereof corresponding to the terminal section 14a, and the movable contact in terminal section 14a is driven by the switch mechanism section 15.

Above the terminal section 14a, the other terminal section 14b is provided on one end of a conductor 31 supported by an insulating spacer 30 at the central position thereof. A fixed contact is provided in the terminal section 14b, and when the switch mechanism section 15 driven, the movable contact of terminal section 14a is vertically moved. In this way, the movable contact is brought into contact with and separated from the fixed contact.

The other end of conductor 31 is led through the insulating spacer 30 and extends into a bushing support tank 32. In the tank 32, a chuck 33 is mounted on the end of the conductor 31. The tank 32 is held gas-tight with respect to the casing 14, and the two are mounted on the support base 11. The conductor 31 is connected to the center conductor 34 extending through the bushing 2b and also to one end of a conductor 35. The conductor 34 extends substantially vertically from the lower end of the conductor 35, and its lower end is provided with a fixed contact 36a of grounding switch 36. A switch mechanism section 36b and an operating mechanism section 36c of grounding switch 36 are provided on the underside of the support base 11 at a position thereof corresponding to the fixed contact 36a. The movable contact of grounding switch 36 is provided in the switch mechanism section 36b, and it is brought into contact with and separated from the fixed contact 36a by driving the switch mechanism section 36c.

A cylindrical intermediate electrode 37 coaxially surrounds the fixed contact 36a at a predetermined spacing therefrom, and it is mounted on the inner wall of the tank 32 via an insulating spacer 37a. The intermediate electrode 37 constitutes a voltage detector having a function of detecting voltage by capacitive voltage division. The intermediate electrode 37 is particularly disposed to surround the fixed contact 36a because by so doing its surface area can be made greater than that of the conductor 35 so that a high static capacitance can be obtained. The tank 32 is provided in its portion where the grounding switch 38 is formed with a manhole 36. This manhole 38 may be used when replacing or inspecting parts of the grounding switch 36. Another manhole 39 is also provided in a portion where the chuck 33 is disposed for the same purpose.

In the chuck 33 one end of a conductor 40 connected to a terminal 20a of arrester 20 is removably inserted.

The construction described above can cope with the recent striking trend for the capacity increase of the circuit breaker 5. With recent improvement of the circuit breaking performance, the number of circuit breaking points provided in series in the circuit breaker tends to be reduced to one half. For example, with 300-kV class circuit breakers it tends to be reduced from two points to one point and with 550-kV class circuit breakers four breaking points tend to be replaced with two points. This means a tendency of reduction of the axial dimension of the tank 5a of the circuit breaker 5. On the other hand, it is necessary to provide the air insulation distance L between the heads of bushings 2a and 2b. To ensure the air insulation distance L, it may be thought to mount the bushings 2a and 2b in an inclined state on the tank 5a if the sole circuit breaker 5 is taken into considerations. With the switching apparatus according to the invention, the individual component units are rationally arranged so that it is unnecessary to mount the bushings 2a and 2b in any inclined state. The upright disposition of the bushings 2a and 2b with respect to the aixs of the circuit breaker tank 5a is desirable from the standpoint of the resistance against earthquakes and also permits ready setting of the mechanical strength of the opening of the upright section of each of the bushings 2a and 2b. Further, this facilitates the manufacture of the tank 5a. Nevertheless, the air insulation distance L between the bushings 2a and 2b mentioned above can be ensured by the disposition of the disconnecting switch 14 between the bushings 2a and 2b as shown in FIG. 2. With the arrangement shown in FIG. 1, where the bushing 2b is disposed upright on the disconnecting switch 14, the distance between the bushings is about 4.5 m if the dummy conductor 7 has a length which is just sufficient for mounting the annular current transformer 9. This distance is insufficient with a circuit breaker with a voltage rating of 500 kV and having two breaking points, with which the minimum air insulation distance is 5 m. Therefore, the length of the dummy conductor 7 has to be correspondingly increased. With the embodiment of FIG. 2, in which the disconnecting switch 14 is disposed between the bushing support tank and circuit breaker 5, the distance L between the bushings is about 6 m, which is sufficient for the aforementioned circuit breaker. Further, with the construction of the embodiment of FIG. 2, in which the disconnecting switch 14 and grounding switch 36 are provided in separate tanks 14c and 32, the grounding switch 36 can be disposed in a lower part of the interior of the bushing support tank 32 so that there is no possibility of contaminating the surfaces of the insulating spacers 19 and 30 with metal particles, which are increasingly generated with increasingly severe opening and closing duty of the grounding switch 36 applied for use with a large capacity power transmission system. Thus, it is possible to extremely improve the reliability of the insulation performance. Further, since the operating mechanism section 36c of the grounding switch 36 and the operating mechanism section 15 of the disconnecting switch 14 can be disposed at the same level on the support base 11, they can be readily operated and inspected from the ground level, i.e., without need of any operating floor. Further, since the chuck 33 is provided in the bushing support tank 32 such that it is constituted a removable juncture section with respect to the arrester 20, at the time of the breakdown voltage test in factory or after installation in the operating site, the juncture section of the chuck 33 can be removed by making access to it from the manhole 39 to prevent severe voltage stress from being applied to the element of the arrester 20 and thus protect the service life of the element.

With the above embodiment, it is possible to provide a hybrid switching apparatus suited for a high capacity power transmission system, which can ensure the necessary air insulation distance between bushings without provision of any wasteful dummy conductor or bus bar section even if a small size circuit breaker is used and also can be reduced in size as a whole. Further, since the opposite side bushings are disposed upright, the construction is suitable from the standpoint of the disposition of a power station as a whole. Further, since the disconnecting switch and grounding switch can be disposed at that same level with respect to the ground surface and aligned to the same direction, the maintenance and inspection can be carried out totally from the ground level without need of any particular operating floor.

Figure 3:
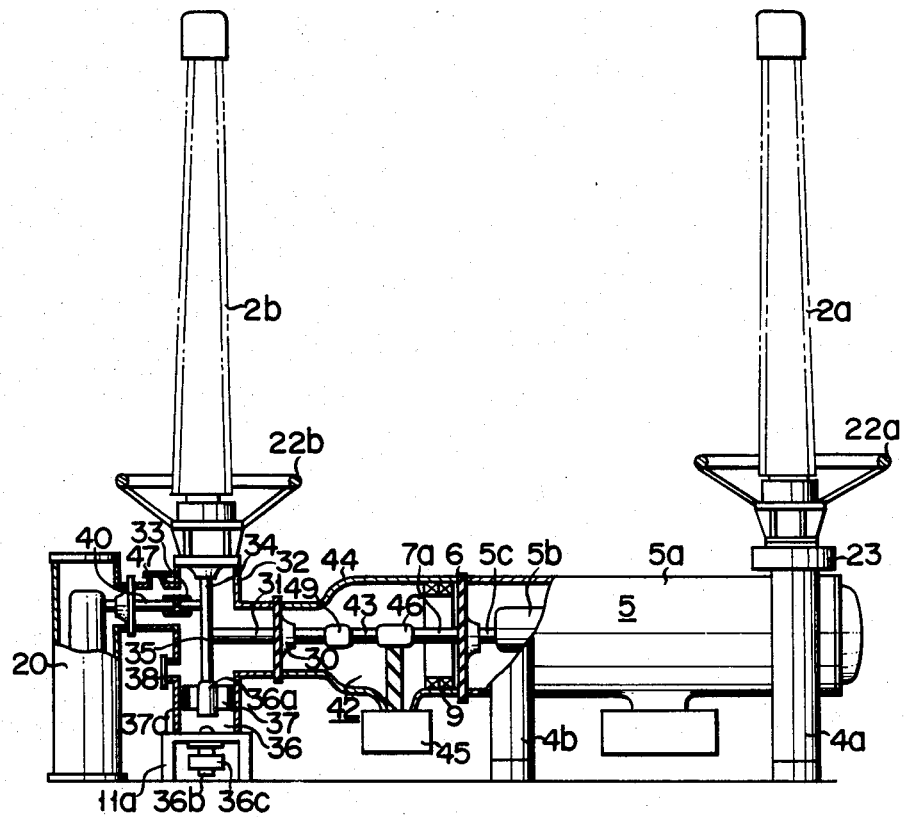
FIGS. 3 to 6 are elevational views, partly broken away, showing other embodiments of the gas insulated switching apparatus according to the invention.

FIG. 3 shows a different embodiment of the invention. In this embodiment, a disconnecting switch 42 is constructed by disposing a disconnecting switch tank 44 adjacent to one end of circuit breaker 5, disposing a movable contact 43 movably in the axial direction of the circuit breaker and providing an operating mechanism section 45 at the lower end of the disconnecting switch tank 44. One terminal 46 of the disconnecting switch 42 is connected to the terminal 5c of the circuit breaker 5 via a conductor 7a supported by an insulating spacer 6, and the other terminal 49 extends through an axial extension of the tank 5a of circuit breaker 5 and is connected to a conductor 35 which is accommodated in a bushing support tank 32 and extends along the extension line of center conductor 34. A grounding switch 36 includes a fixed contact section 36a provided on the lower end of the conductor 35, a switch mechanism section 36b and an operating mechanism section 36c, these sections being provided under the bushing support tank 32, and a movable contact section facing the fixed contact section and operated by the operating mechanism section 36c. Again in this embodiment, the arrester 20 is connected via a removable conductor or chuck 33 to the juncture between the center conductor 34 and conductor 35. Here, current transformer 9 is accommodated in the tank 44.

With the switching apparatus having the above construction shown in FIG. 3, the point of support of the bushing 2b is lower in level than that in case of FIG. 2, specifically by an amount corresponding to the distance between the terminal sections 14a and 14b of the disconnecting switch 14 in FIG. 1, and this is advantageous from the standpoint of the resistance against earthquake. This means that the bending rigidity of the bushing support tank 32 and that of the support base 11a supporting the tank may be reduced, which is economically advantageous in the manufacture of the tank 32. The removable conductor 33 mentioned above can be removed and reinserted by making use of a manhole 47 provided in the support tank 32.

Figure 4:
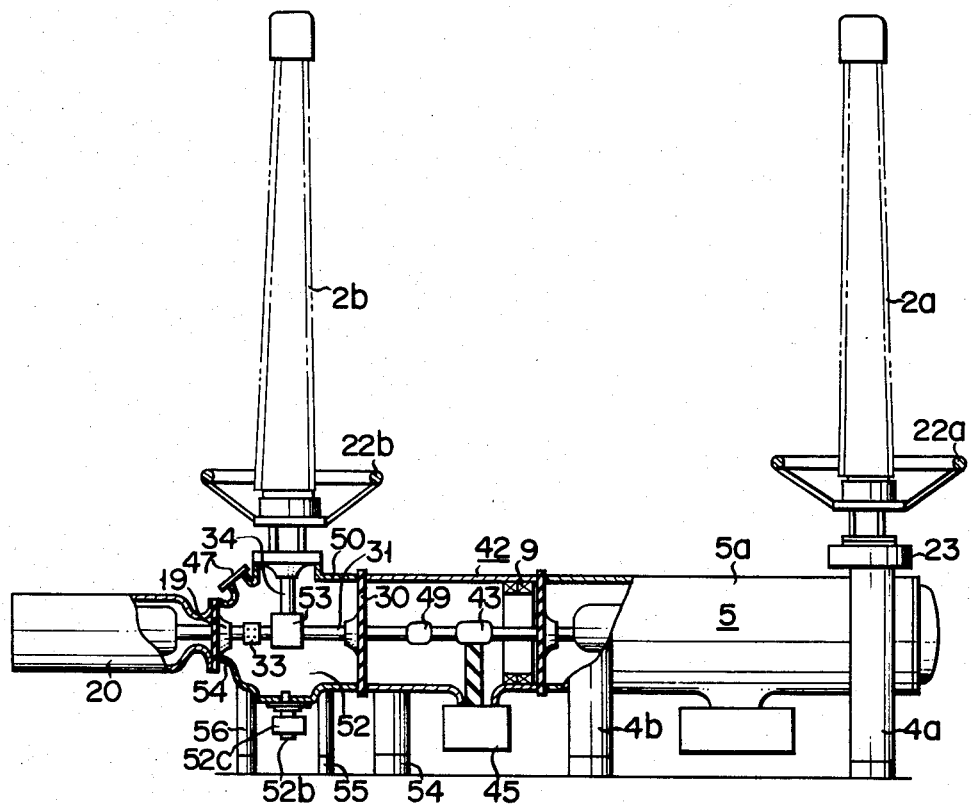

FIG. 4 shows a further embodiment, in which disconnecting switch 42 and grounding switch 52 are disposed in axial alignment to circuit breaker 5. In this embodiment, the support level of the bushing 2b may be lowered down to substantially the support level of the bushing 2a provided at one end of the circuit breaker 5. Thus, the earthquake resistance of the bushing 2b can be further increased, and the bushing 2b can be firmly supported like the aforementioned end of the circuit breaker 5. The fixed contact 53 of the grounding switch 52 is provided on the lower end of the center conductor 34 extending through the bushing 2b, and a conductor 31 is connected to the contact 53. The switch mechanism section 52b and operating mechanism section 52c are mounted on the underside of the tank 50. The tank of grounding switch 52, i.e., bushing support tank 50, is provided on the side opposite the disconnecting switch 42 with an opening 54, on which a gas-tight insulating spacer 19 is mounted. Thus, all the units of the switching apparatus can be disposed along a straight line. This means that the operating mechanism sections of the individual units can be disposed under the respective units, so that the level of the center of gravity of the switching apparatus itself can be further lowered. Further, when carrying out a breakdown voltage test in factory or after installation in the operating site, the removable conductor 33 may be removed by making use of the manhole 47 to protect the element of the arrester 20 from severe test voltage stress. The disconnecting switch 42 and grounding switch 52 are supported by support bases 54, 55 and 56.

Figure 5:
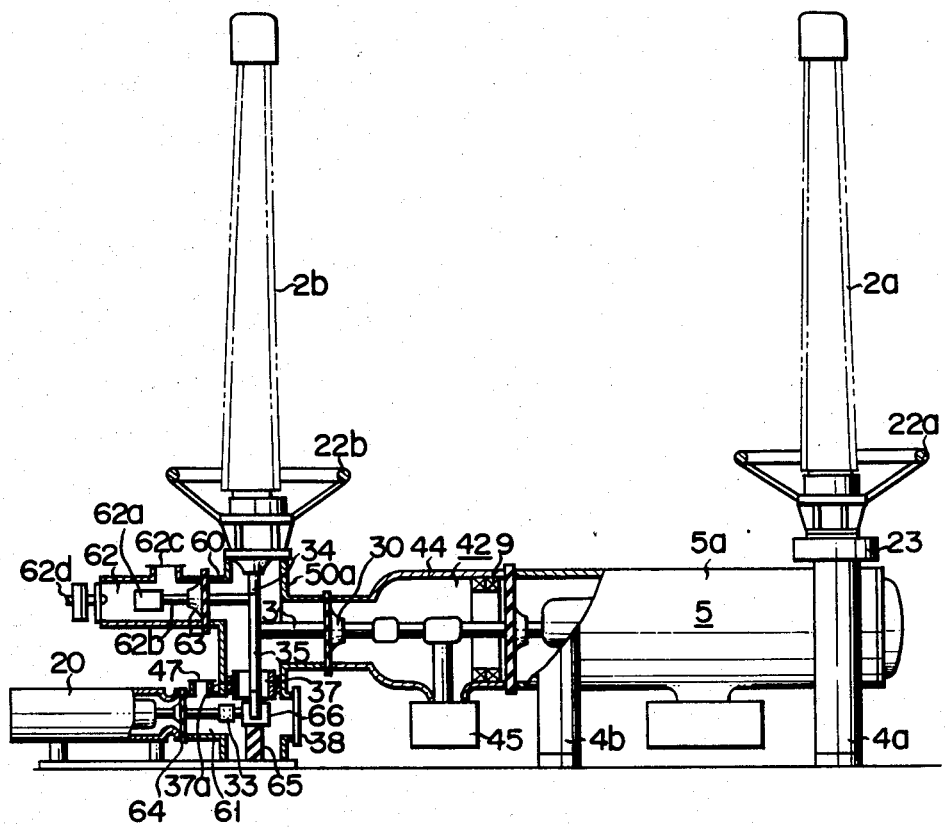

FIG. 5 shows a further embodiment, in which grounding switch 62 and arrester 20 are mounted on one side of bushing support tank 50. More particularly, in FIG. 5, the grounding switch 62, which has a tank 50a containing a sealed insulating gas, and the arrester 20 are coupled via respective insulating spacers 63 and 64 to extensions 60 and 61 of bushing support tank 50a, which are provided on the side of the tank 50a opposite the disconnecting switch 42 and extend in a direction crossing the axis of the center conductor 34 in the bushing 2b. Like the circuit breaker 5, the grounding switch 62 and arrester 20 extend horizontally. The center conductor 34 in the bushing 2b also extends into the bushing support tank 50a, in which a conductor 35 also extends along the extension line of the center conductor 34. The lower end of the conductor 35 is provided with a contact 66 supported by an insulator 65. The contact 66 is connected to the inner element of arrester 20 via removalable conductor 33. The fixed contact 62a of grounding switch 62 is connected to the conductor 34 or 35 via a conductor 62b. The inspection of the grounding switch 62 is made by making use of a manhole 62c. With this construction, at the time of a breakdown voltage test performed in factory or after installation in the operating site the element of the arrester 20 can again be protected from severe voltage stress at the time of the test by removing the removable conductor 33 by making use of the manhole 47 or 38. Since the grounding switch 62 can be disposed on the extension of axis of the circuit breaker 5 and also the arrester 20 is disposed below the grounding switch 62, the level of support of the bushing 2b with respect to the ground surface can be further lowered. Further, since the support tank 50a is installed without using any support base but directly on the ground surface, the resistance against earthquake can be further improved.

As the characteristic element of the arrester 20, zinc oxide (ZnO) as a main component has been recently used. This element, however, can be deteriorated by heat. With the construction shown in FIG. 5, therefore, it is liable that the characteristic element is elevated in temperature and deteriorated because the arrester 20 is exposed to direct sunlight.

Figure 6:
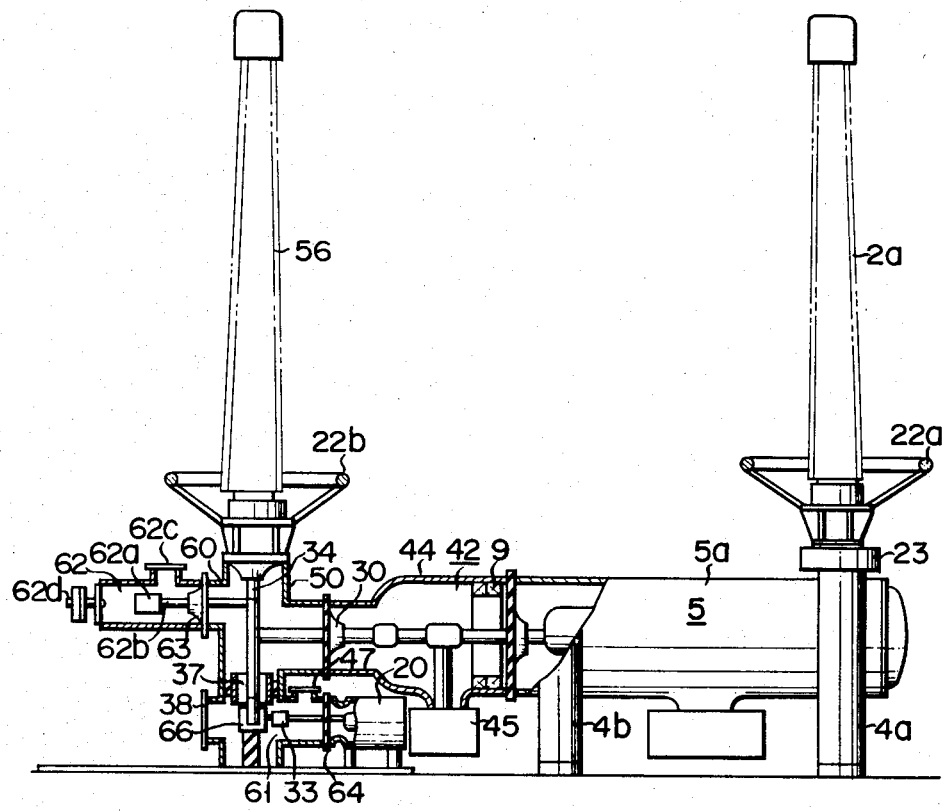

FIG. 6 shows a further embodiment, which may be used where the arrester uses a characteristic element composed of ZnO. In this embodiment, arrester 20 is disposed beneath the casing 44 of disconnecting switch 42. With this construction, the temperature rise of the arrester 20 due to direct sunlight can be avoided, so that it is possible to prevent the deterioration of the element. For the rest, the construction is entirely the same as that of FIG. 5.

As has been described in the foregoing, according to the invention it is possible to cope with the size reduction of the circuit breaker and ensure necessary interbushing air insulating distance without provising of any particular intermediate dummy conductor or bus bar device. With the disconnecting switch and grounding switch distinctly defined with respect to each other by a gas-tight insulating spacer, when a given number of operations of the grounding switch (for instance 200 operations as a reference of inspection of grounding switch capable of a current switch function) is reached, it is readily possible to recover gas only in the grounding switch and inspect the contacts of the grounding switch by making use of a manhole provided therein. Further, where the contact sections of the grounding switch are disposed in a lowermost portion, a construction with which metal particles generated in the opening and closing operations are hardly deposited on insulating spacers can be readily obtained. Further, since the operating mechanism sections of the individual component units are disposed at comparatively low levels, the maintenance, inspection and manual operation of the operating mechanism sections can be made without need of any particular operating floor. Further, the lightning arrester, which is a protective relay on the side of the line, is desirably disconnected at the time of a breakdown voltage test carried out in factory or after installation in the operating site in order to avoid its operation and protect the life of the arrester element against overvoltage. Hitherto, a disconnecting switch or the like is especially provided for the arrester, and in normal service it is held inoperative so that it merely serves as a connecting conductor. This arrangement is very uneconomical. According to the invention, an economical construction is provided by providing, if necessary, a removable conductor within the bushing support tank in view of the fact that the arrester may be disconnected from the rest of the circuitry only at the time of carrying out a breakdown voltage test. Further, the voltage detector, which is formed without using any separate tank but within the bushing support tank by providing an intermediate electrode to concentrically surround the fixed contact of the grounding switch, extremely promotes the economy of the construction.

What we claim is:

1. A gas insulated switching apparatus comprising a circuit breaker including a horizontal grounded tank containing a sealed insulating gas and a circuit breaker section accommodated in said grounded tank and having one terminal section, a first bushing exposed to the atmosphere disposed upright on one side of said tank at a first end of said tank, said first bushing having a center conductor extending therein and connected to said one terminal section, a disconnecting switch including a second tank disposed in the axial direction of and adjacent to a second end of said horizontal grounded tank, said second tank being isolated from said horizontal grounded tank by first gas-tight means and containing a sealed insulating gas and a disconnecting switch section, a bushing support tank disposed in the axial direction of and adjacent to the end of said second tank opposite said circuit breaker, said bushing support tank being isolated from said second tank by second gas-tight means and containing a sealed insulating gas, said bushing support tank accommodating a grounding switch, and a second bushing exposed to the atmosphere disposed upright on top of said bushing support tank, the other terminal section of said circuit breaker being connected to one terminal of said disconnecting switch section via a conductor passing through said first gas-tight means, the other terminal of said disconnecting switch section being connected to a fixed contact of said grounding switch and also to a center conductor extending in said second bushing via a conductor passing through said second gas-tight means.

2. The gas insulated switching apparatus according to claim 1, wherein said grounding switch is disposed in a lower portion of the interior of said bushing support tank.

3. A gas insulated switching apparatus comprising a circuit breaker including a horizontal grounded tank containing a sealed insulating gas and a circuit breaker section accommodated in said grounded tank and having one terminal section, a first bushing exposed to the atmosphere disposed upright on one side of said tank at a first end of said tank, said first bushing having a center conductor extending therein and connected to said one terminal section, a disconnecting switch including a second tank disposed in the axial direction of and adjacent to a second end of said horizontal grounded tank, said second tank being isolated from said horizontal grounded tank by first gas-tight means and containing a sealed insulating gas and a disconnecting switch section, a bushing support tank disposed in the axial direction of and adjacent to the end of said second tank opposite said circuit breaker, said bushing support tank being isolated from said second tank by second gas-tight means and containing a sealed insulating gas, said bushing support tank accommodating a grounding switch, a second bushing exposed to the atmosphere disposed upright on top of said bushing support tank, the other terminal section of said circuit breaker being connected to one terminal of said disconnecting switch section via a conductor passing through said first gas-tight means, the other terminal of said disconnecting switch section being connected to a fixed contact of said ground switch and also to a center conductor extending in said second bushing via a conductor passing through said second gas-tight means, and a voltage detector including an intermediate electrode concentrically surrounding a conductor disposed in said bushing support tank.

4. The gas insulated switching apparatus according to claim 3, wherein said intermediate electrode is disposed to surround the fixed contact of said grounding switch.

5. A gas insulated switching apparatus comprising a circuit breaker including a horizontal grounded tank containing a sealed insulating gas and a circuit breaker section accommodated in said grounded tank and having one terminal section, a first bushing exposed to the atmosphere disposed upright on one side of said tank at a first end of said tank, said first bushing having a center conductor extending therein and connected to said one terminal section, a disconnecting switch including a second tank disposed in the axial direction of and adjacent to a second end of said horizontal grounded tank, said second tank being isolated from said horizontal grounded tank by first gas-tight means and containing a sealed insulating gas and a disconnecting switch section, a bushing support tank disposed in the axial direction of and adjacent to the end of said second tank opposite said circuit breaker, said bushing support tank being isolated from said second tank by second gas-tight means and containing a sealed insulating gas, a second bushing exposed to the atmosphere disposed upright on top of said bushing support tank, a removable conductor, and a lightning arrester, said lightning arrester being coupled to said bushing support tank and isolated therefrom by gas-tight means, the other terminal section of said circuit breaker being connected to one terminal of said disconnecting switch section via a conductor passing through said first gas-tight means, the other terminal of said disconnecting switch section being connected to a fixed contact of said grounding switch and also to a center conductor extending in said second bushing via a conductor passing through said second gas-tight means, and the center conductor in said second bushing being connected to an inner element of said lightning arrester via said removable conductor.

6. The gas insulated switching apparatus according to claim 5, wherein the lightning arrester is coupled to a side of the bushing support tank opposite to a side to which the disconnecting switch is coupled.

7. The gas insulated switching apparatus according to claim 5, wherein said lightning arrester is disposed underneath said disconnecting switch tank and prevented from being exposed to direct sunlight.

8. The gas insulated switching apparatus according to claim 1, said apparatus further comprising a lightning arrester and a removable conductor, said lightning arrester being coupled to said bushing support tank and isolated therefrom by gas-tight means, the center conductor in said second bushing being connected to an inner element of said lightning arrester via removable conductor.

9. The gas insulated switching apparatus according to claim 3, said apparatus further comprising a lightning arrester and a removable conductor, said lightning arrester being coupled to said bushing support tank and isolated therefrom by gas-tight means, the center conductor in said second bushing connected to an inner element of said lightning arrester via said removable conductor.

* * * * *